US007609290B2

(12) United States Patent
McEwan

(10) Patent No.: US 7,609,290 B2
(45) Date of Patent: Oct. 27, 2009

(54) SURVEILLANCE SYSTEM AND METHOD

(75) Inventor: John McEwan, Dulles, VA (US)

(73) Assignee: Technology Advancement Group, Inc., Dulles, VA (US)

( * ) Notice: Subject to any disclaimer, the term of this patent is extended or adjusted under 35 U.S.C. 154(b) by 995 days.

(21) Appl. No.: 11/044,006

(22) Filed: Jan. 28, 2005

(65) Prior Publication Data

US 2006/0170772 A1 Aug. 3, 2006

(51) Int. Cl.
*H04N 7/00* (2006.01)
*G06K 9/36* (2006.01)

(52) U.S. Cl. ........................................ 348/36; 382/284

(58) Field of Classification Search ................. 348/172, 348/39, 46, 42, 50, 49, 185, 189, 190, 222, 348/399, 565, 152, 207.99, 576, 47, 61; 382/300, 382/178, 284, 285, 282, 293, 296, 294, 154, 382/107, 117, 275
See application file for complete search history.

(56) References Cited

U.S. PATENT DOCUMENTS 5,631,697 A * 5/1997 Nishimura et al. .......... 348/172
6,005,987 A * 12/1999 Nakamura et al. .......... 382/294
6,978,052 B2 * 12/2005 Beged-Dov et al. ......... 382/284
6,993,159 B1 * 1/2006 Ishii et al. ................... 382/104
2002/0057340 A1 * 5/2002 Fernandez et al. .......... 348/143
2004/0189674 A1 * 9/2004 Zhang et al. ................ 345/629
2005/0117023 A1 * 6/2005 Seo ....................... 348/207.99
2006/0008176 A1 * 1/2006 Igari et al. .................. 382/284
2007/0279494 A1 * 12/2007 Aman et al. ................ 348/169
2008/0175441 A1 * 7/2008 Matsumoto et al. ......... 382/107

* cited by examiner

*Primary Examiner*—Behrooz Senfi
(74) *Attorney, Agent, or Firm*—Nixon Peabody LLP

(57) ABSTRACT

A method and apparatus for detecting motion in a large area with a single imaging device, such as a camera. A fixed object is located in the area and a camera is panned across the area with the fixed object remaining in the field of view of the camera. Successive images are adjusted based on the position of the fixed object within the image and the adjusted images are compared to detect movement with an area of overlap between the images.

16 Claims, 3 Drawing Sheets

SURVEILLANCE SYSTEM AND METHOD

BACKGROUND

The invention relates generally to motion detection and more specifically to a surveillance system and method, for use in security systems or the like, in which a moving camera can be used to detect motion in an area.

Conventional security systems typically protect an enclosed area using switches at doors, windows, and other potential entry points. When a switch is activated, an alarm is sounded, a message is generated, or some other means of notifying the appropriate persons and/or discouraging the persons breaching security is activated. It is also known to use passive infra red (PIR) sensors, which sense heat differences caused by animate objects such as humans or animals, to detect the presence of persons in unauthorized areas. Other sensors used in surveillance and security systems include vibration sensors, radio frequency sensors, laser sensors and microwave sensors. Sensors often can be activated erroneously by power surges or large electromagnetic fields, such as occur when lightening is present. Such activation of course can trigger a false alarm.

To increase the reliability of security and surveillance systems, video cameras have been used to monitor premises. However, with camera surveillance, a constant communications channel must be maintained with the operator at the monitoring site. It is known to combine video camera surveillance with another sensing mechanism, a PIR sensor, for example, so actuation of the video camera is initiated by activation of the other sensor and the operator's attention is focused by sounding an alarm or delivering a message. However, when monitoring continuous video, even for relatively short periods of time, the operator must maintain a constant vigilance. However, an operator's ability to pay attention to a video display generally diminishes rapidly to the point where the operator is essentially ineffective after several minutes. Accordingly, video surveillance is labor intensive, expensive, and not always effective.

More recently, video cameras have been used to monitor an area within a field of view and the resulting image signal is processed to detect any motion in the field of view. U.S. Pat. No. 4,408,224 is exemplary of such systems in which a video camera monitors an area, such as a parking lot, and produces a video signal. The video signal is digitized and stored in a memory and is compared with a previous video signal that has been digitized and stored in a memory. If any differences between the two signals exceeds a threshold, an output is generated and fed to an alarm generation circuit. Various algorithms can be used to compare video signals with one another to determine if motion has occurred in the monitored area. For example, U.S. Pat. No. 6,069,655 discloses comparing video signals on a pixel by pixel basis, generating a difference signal between the two signals, and interpreting any non-zero pixel in the difference signal to be a possible movement. U.S. Pat. No. 4,257,063 discloses a video monitoring system in which a video line from a camera is compared to the same video line viewed at an earlier time to detect motion. U.S. Pat. No. 4,161,750 teaches that changes in the average value of a video line can be used to detect motion.

While the use of video cameras for detecting motion has solved many problems associated with surveillance, some limitations still exist. Specifically, a video camera can only monitor an area within its field of view. The field of view can be increased by locating the camera at a position far away from the area or by using wide angle optics. In either case, each pixel of the imager in the camera will correspond to a larger portion of the area as the field of view is increased. Therefore as the field of view is increased, resolution of the image signal decreases and the ability of the camera to accurately detect motion is reduced. To increase the area covered by a video camera surveillance system, it is well known to provide multiple video cameras. Of course, this increases the cost and complexity of the surveillance system. It is also known to utilize a moving camera to increase the field of view. For example, U.S. Pat. No. 5,473,364 discloses a surveillance system having moving cameras. However, the system disclosed in U.S. Pat. No. 5,473,364 requires complex algorithms, such as affine transforms, for adjusting images for camera movement. Accordingly, such systems are complex and require a great deal of processing power.

SUMMARY OF THE INVENTION

An object of the invention is to improve surveillance systems. To achieve this and other objects, a first aspect of the invention is an apparatus for detecting motion in an area. The apparatus comprises an imaging device, such as a camera, having a field of view that is smaller than the area, means for moving the field of view to vary the portion of the area that is covered by the field of view, means for storing a first set of image data captured by the imaging device when the field of view covers a first portion of the area and for storing a second set of image data captured by the imaging device when the field of view covers a second portion of the area, means for determining a fixed object image portion in an overlapping area, means for adjusting at least one of the first set of image data and the second set of image data based on the fixed object image portion to obtain two sets of adjusted image data, and means for comparing the two sets of corrected image data to determine if any objects in the overlapping area have moved.

A second aspect of the invention is a method for detecting motion in an area of interest. The method comprises recording test image data of a portion of the area having a fixed object therein, selecting a portion of the test image data corresponding to the fixed object, storing the portion of the test image data as learned image data, recording first image data at a first field of view, changing the field of view to a second field of view including the fixed object, recording second image data at the second field of view, recognizing the fixed object in the first image data and the second image data, adjusting at least one of the first image data and the second image data for position based on the position of the fixed object in the first image data and the second image data, and comparing the first image data and the second image data after the adjusting step to determine if motion has occurred in an area encompassed by both the first field of view and the second field of view.

BRIEF DESCRIPTION OF THE DRAWING

The invention is described through a preferred embodiment and the attached drawing in which.

DETAILED DESCRIPTION

Figure 1:
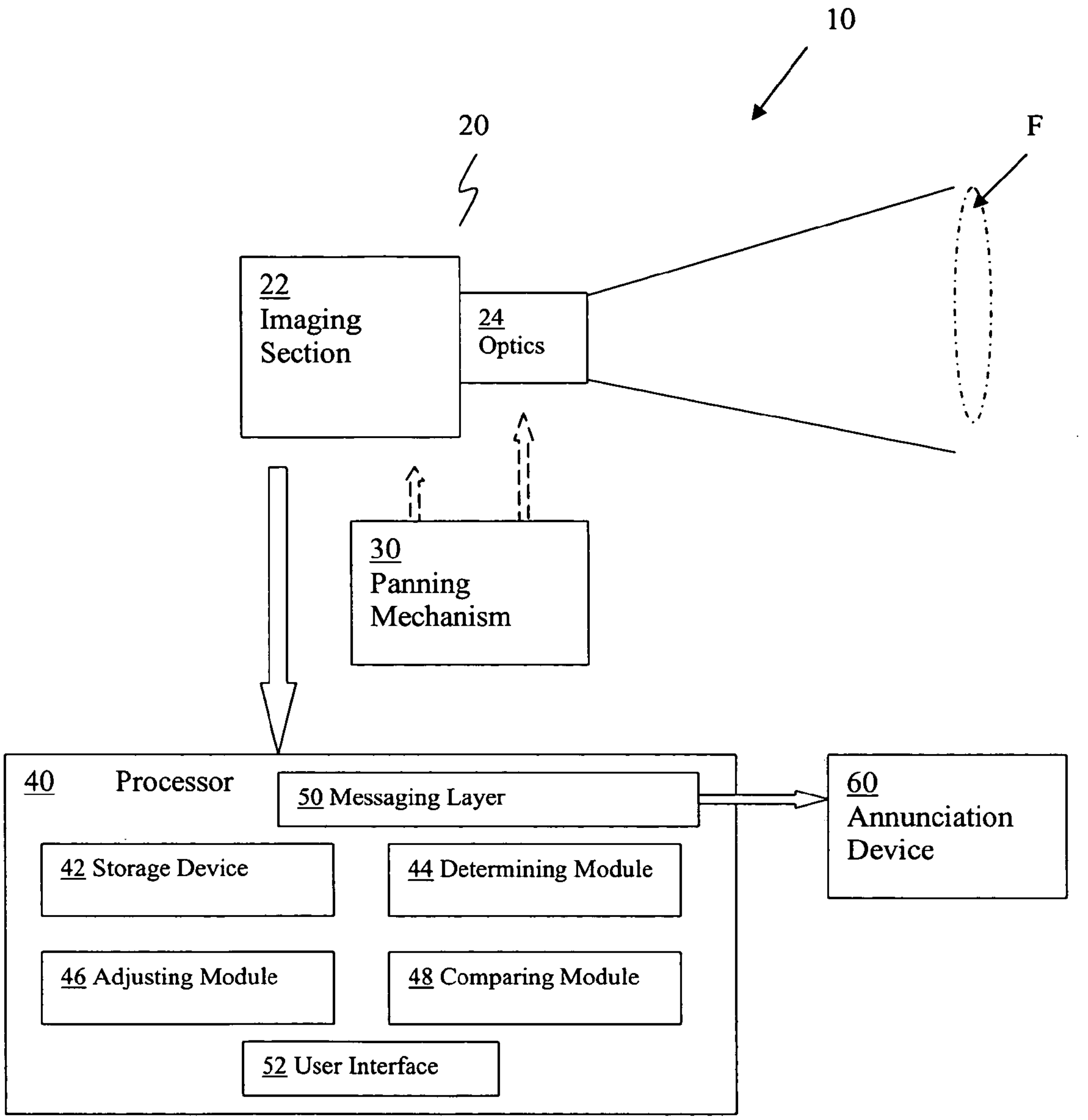
FIG. 1 is a black diagram of a surveillance system of the preferred embodiment.

FIG. 1 illustrates a surveillance system in accordance with a preferred embodiment of the invention. Surveillance system 10 utilizes a single imaging device, camera 20 in the preferred embodiment, to detect motion over a large area. Camera 20 includes imaging section 22 and optics section 24 and has field of view F. The phrase "field of view," as used herein, refers to the effective area of a scene that can be imaged on the image plane of camera 20 at a given time. Imaging section 22 includes an imager, such as a known solid state imager, for sensing light at a plurality of points in a scene. For example, the imager can be an active pixel Complementary Metal Oxide Semiconductor (CMOS) sensor, such as that described in U.S. Pat. No. 6,215,113, or the imager can be a Charge Coupled Device (CCD). Optics section 24 serves to focus light from the scene in the field of view of camera 20 onto the imager. For example, optics section 24 can include a lens system, aperture diaphragm, and the like for focusing the image and adjusting exposure. Imaging section 22 can include appropriate imaging electronics, such as an A/D converter, for outputting an image signal corresponding to light sensed by the imager. Optics section 24 can also include mirrors, prisms, or other elements as necessary to accomplish the functions set forth herein.

Imaging section 22 and/or optics section 24 are coupled to panning mechanism 30 which comprises a motive device to move the field of view as desired by moving camera 20, imaging section 22, or optic section 24. For example, the motive device can be the output shaft of a transmission coupled to a motor to rotate camera 20 about an axis or move camera 20 linearly. Further, the motive device can be coupled to a mirror or other element of optics section 24 to change the field of view without the need to move imaging section 22. Panning mechanism 30 can be any device or combination of devices for moving the field of view of camera 20 across a desired area.

Processor 40 of the preferred embodiment can comprise a microprocessor based device, such as a general purpose programmable computer. For example, processor 40 can be embodied in a personal computer, a server, or a dedicated programmable device. Processor 40 includes storage device 42, determining module, 44, adjusting module 46, comparing module 48, messaging layer 50, and user interface 52. The various components of processor 40 can be embodied as hardware and/or software, as will become apparent below. Such components are described as separate entities for the clarity. However, the components need not be embodied in separate hardware and/or software and the functionality thereof can be combined or further separated. For example, all of the modules can be embodied in a single executable program file of a control program running on processor 40.

Camera 20 generates a set of image data as an image signal based on the image in the field of view and communicates the signal to processor 40 for processing. As the field of view changes, by virtue of panning mechanism 30, the image signal changes accordingly.

Storage device 42 can include a Random Access Memory (RAM), a magnetic disk, such as a hard disk, or any other device capable of retaining image data. Image data corresponding to the image signal is stored in storage device 42. The image data can be updated periodically, such as every second, every minute, or the like. Because the field of view is changing, the image signal will change over time. Storage device 42 preferably is capable of storing at least two sets of image data at a time for reasons which will become apparent below.

Determining module 44 can include any algorithm or other logic for determining a static portion of an image corresponding to an image signal stored in memory device 42. For example, Principal Component Analysis (PCA) techniques can be used. PCA distributes image data of a multidimensional image space and converts the image data into feature space. The principal components of eigenvectors which serve to characterize such space are then used for processing. More specifically, the eigenvectors are defined respectively by the amount of change in pixel intensity corresponding to changes within the image group, and can thus be thought of as characteristic axes for explaining the image.

A large number of eigenvectors are required to accurately reproduce an image. However, if one only desires to express the characteristics of the outward appearance of an image, the image can be sufficiently expressed using a smaller number of eigenvectors to thereby reduce the required processing power. Known PCA techniques can be used to compare a "learned" image with a current image to recognize patterns in the present image that are similar or identical to the learned image. In the preferred embodiment, the learned image is a designated portion of a previous image signal taken by camera 20 as described in detail below.

The learned image can be obtained by directing camera 20 toward an area including a substantially fixed object, such as a tree, a sign, a building, or a portion of such an object. The resulting image can be displayed on a screen in user interface 52, such as a CRT display or the like. The operator can then designate the portion of the image representing the fixed object by selecting that portion of the image with a mouse pointer or other input device in a known manner. The portion of the image data representing the fixed object is then stored as a learned image. This learned image can be recognized in subsequent images by determining module 44, using PCA techniques for example, and the position of the learned image in the current image can be output to adjusting module 46.

Alternatively a software algorithm of determining module 44 can automatically determine a portion of an image representing a fixed object using any known image analysis technique. For example, determining module 44 can determine a fixed object image portion by comparing successive image data of a test field of view to determine a reference image portion having a fixed object therein, i.e. a portion where data does not change in successive views. The reference image portion can then be compared with portions of the first and second image data to determine which portion of the first and second image data has the fixed object therein. Many reference images can be taken over time to eliminate false fixed objects, such as cars, that may appear fixed and then can be moved later on.

Adjusting module 46 includes logic for adjusting images based on the determination of determining module 44. In particular, adjusting module 46 compares the position of the learned image in two sets of image data and offsets the image data of at least one set of image data to locate the learned image in the same place in each set of image data. This operation permits the adjusted image data to be compared notwithstanding the fact that the field of view is different for each set of image data.

The adjusted sets of image data are sent to comparing module 48 for comparison in a known manner to ascertain if an object in the area has moved, e.g., an animate object has entered the area of surveillance. Appropriate filters and other logic can be applied to the determination to reduce detection of motion caused by small animals, wind, or the like, in a known manner. In the case of motion detection, messaging layer 50 can send a message, or other signal, to annunciation device 60 which can include an audible alarm, an image display, a phone dialer, or the like, to notify the proper parties and provide the desired information thereto.

Figure 2:
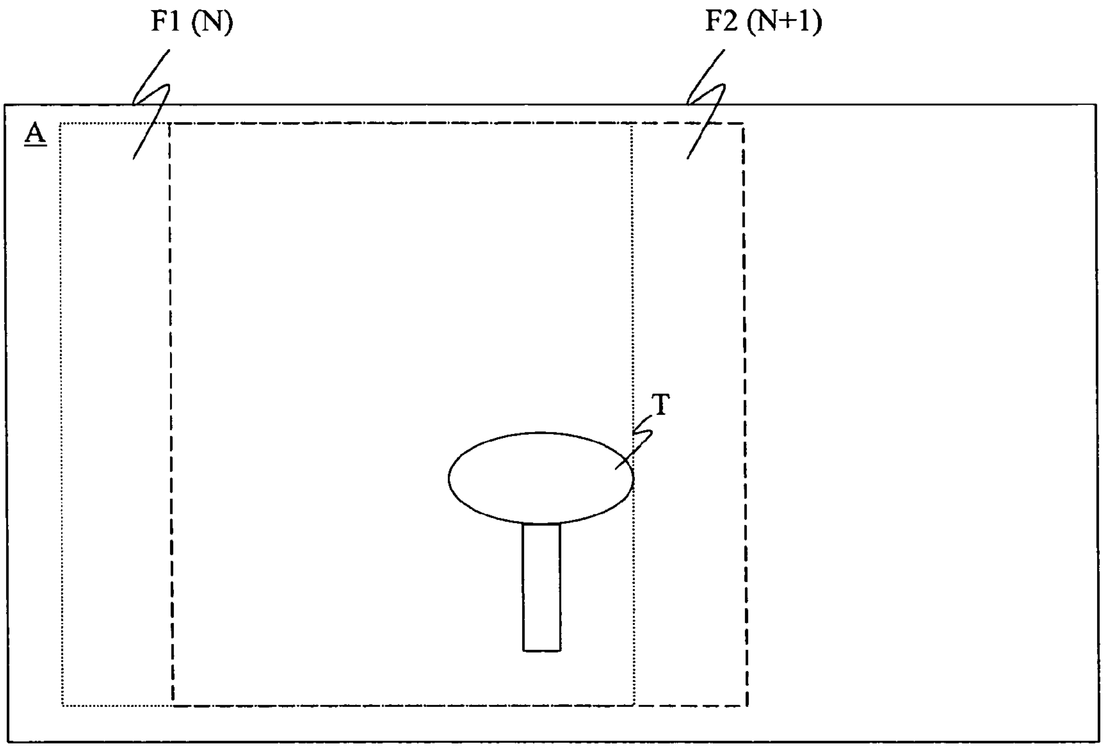
FIG. 2 is a diagram illustrating the moving field of view of the preferred embodiment.

FIG. 2 Illustrates the ability of the preferred embodiment to provide surveillance of a large area with a small amount of cameras by moving the field of view. In this example, the area to be converted by surveillance system 10 is area A (designated by the solid line in FIG. 2). Field of view F1 (designated by the dotted line in FIG. 2) of camera 20 at a first position does not cover the entirety of area A. However, field of view F1 does encompass tree T as a fixed object. The image of tree T can be selected as the learned image to be used for position adjustment by adjusting module 46. The field of view of camera 20 can then be changed by panning mechanism 30 to be field of view F2 (designated by the dashed line in FIG. 2). Note that field of view F2 also encompasses tree T. Accordingly, image data of overlapping portions of field of view F1 and field of view F2 can be compared after adjustment in the manner described above. It can be seen that the field of view can be changed incrementally to span the entirety of area A, as long as each field of view includes tree T, while comparing overlapping portions of successive sets of image data to thereby cover the entirety of area A with only camera 10.

Figure 3:
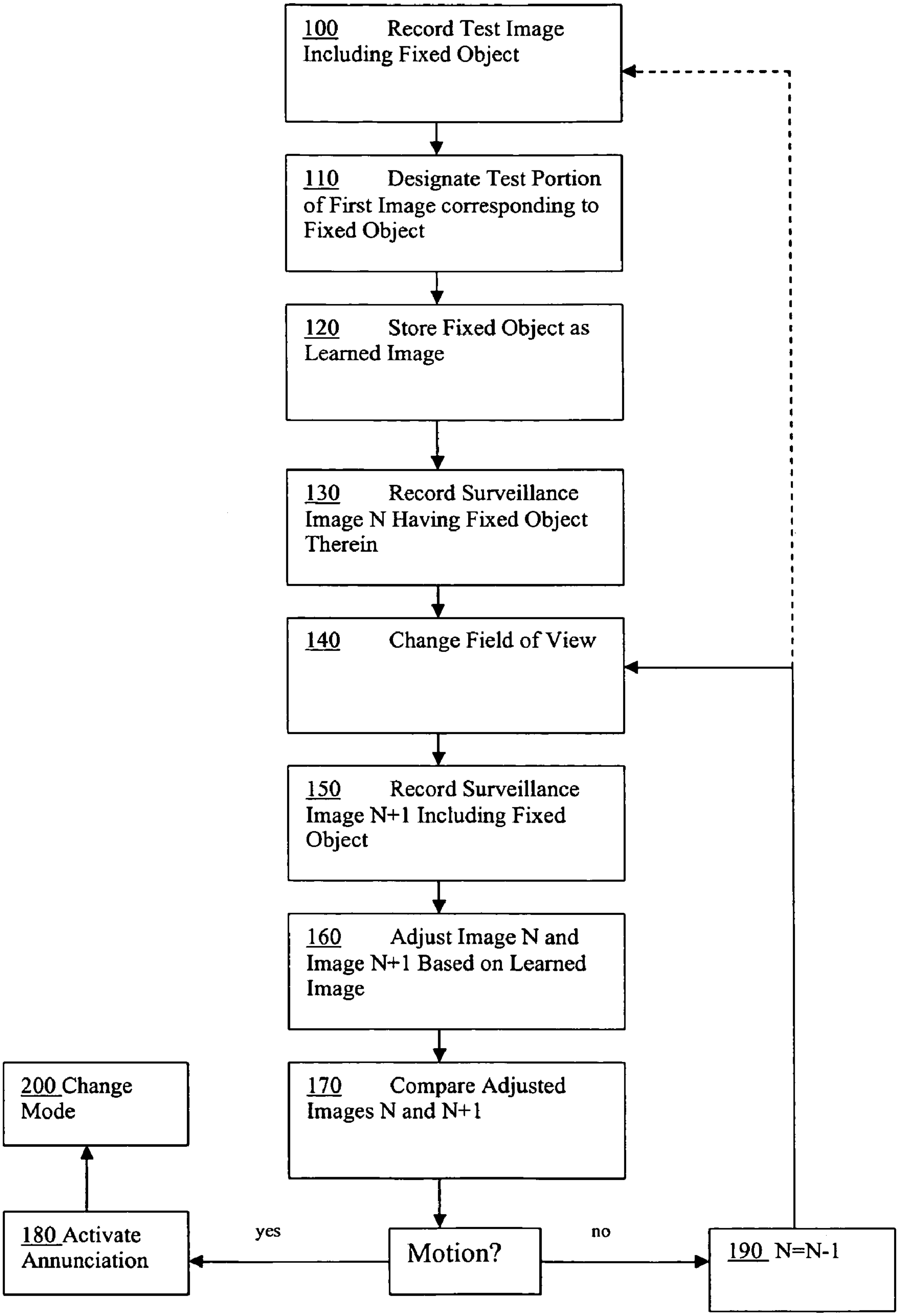
FIG. 3 is a flow chart of the surveillance method of the preferred embodiment.

FIG. 3 illustrates the method of surveillance of the preferred embodiment. In step 100, a test image of the area to be monitored is taken and stored in storage device 42. The test image can have any field of view of the area as long as there is a fixed object therein. The fixed object can be any object that is at least partially visible in all fields of view of camera 20 throughout panning of the area and is reasonably still and distinct to be discerned by analyzing image data. In step 110, the portion of the test image having the fixed object therein is selected. For example, the test image can be displayed to a user through user interface 52 and the user can demarcate the fixed image with a mouse pointer, touch screen device, or the like. The image of the fixed object is then stored as a learned image in storage device 42.

In step 130, a surveillance image N of the area is recorded with camera 20 at a first field of view and image N is stored in storage device 42. In step 140, the field of view of camera 20 is changed by an incremental amount by panning mechanism 30, while still including the fixed object, and in step 150, surveillance image N+1 is recorded at the new filed of view. In step 160, adjusting module 46 adjusts one or both of images N and N+1 for position based on the position of the fixed object recognized by determining module 44 in each image. The images N and N+1 are compared after adjustment by comparing module 48 to determine if motion has occurred in the area based on a known algorithm. If it is determined that motion has occurred, annunciation device 60 is activated to sound an alarm or take any appropriate action to notify the proper persons or entities that motion has been detected.

At this time, the mode of surveillance can be changed in step 200. For example, an operator may now be given control of panning mechanism 30 to selectively view portions of the area to ascertain the source of motion or the operator may be presented with various displays automatically. If no motion is detected in step 170, N is set to N−1, i.e. image N+1 becomes image N and surveillance continues in step 140 in the manner described above. This process can continue until panning mechanism has taken the field of view of camera 20 to the edge of the area and can continue with panning mechanism moving in a reverse direction back across the area.

Note that steps 100 through 120, i.e., the recording of the learned image, can be accomplished at the same time as step 130. In other words, the learned image can be captured directly out of the first or subsequent surveillance images. Also, the learned image can be captured again periodically to improve performance. In fact, the learned image can be of plural objects as long as each successive surveillance image includes at least one fixed object in common.

The logic of and data manipulation of the invention can be accomplished by any device, such as a general purpose programmable computer or hardwired devices. The imaging device can be any type of sensor for capturing image data, such as a still camera, a video camera, an x-ray imager, an acoustic imager, an electromagnetic imager, or the like. The camera can sense visible light, infra red light, or any other radiation or characteristic. The panning mechanism can comprise any type of motors, transmissions, and the like and can be coupled to any appropriate element to change the field of view of the camera. Any type of comparison and adjustment algorithm can be used with the invention.

The invention has been described through a preferred embodiment. However, various modifications can be made without departing from the scope of the invention as defined by the appended claims and legal equivalents.

What is claimed:

1. An apparatus for detecting motion in an area, the apparatus comprising:

an imaging device having a field of view that is smaller than the area;

means for moving the field of view to vary the portion of the area that is covered by the field of view;

means for storing a first set of image data captured by said imaging device when the field of view covers a first portion of the area and for storing a second set of image data captured by said imaging device when the field of view covers a second portion of the area, the second portion including a sub area that overlaps a sub area of the first portion to define an overlapping area;

means for determining a fixed object image portion in the overlapping area;

means for adjusting at least one of the first set of image data and the second set of image data based on the fixed object image portion and generating two sets of adjusted image data, each of the two sets of adjusted image data including overlapping area data corresponding to the overlapping area; and means for comparing the overlapping area data of the two sets of adjusted image data to determine if any objects in the overlapping area have moved.

2. An apparatus as recited in claim 1, wherein the imaging device is a camera.

3. An apparatus as recited in claim 1, wherein the means for moving moves the field of view in successive increments to cause the field of view to traverse substantially the entire area while the fixed object image portion remains in the field of view and the first set of image data and the second set of image data respectively correspond to two successive images captured by said camera that correspond to successive increments of the field of view.

4. An apparatus as recited in claim 1, wherein the means for storing comprises a memory device and wherein the means for determining, the means for adjusting, and the means for comparing all comprise a programmed microprocessor based device.

5. An apparatus as recited in claim 1, wherein the means for moving comprises means for rotating the imaging device about an axis.

6. An apparatus as recited in claim 1, wherein the means for moving comprises means for moving the imaging device linearly.

7. An apparatus as recited in claim 1, wherein the means for moving comprises means for adjusting optics associated with the imaging device to thereby change the field of view.

8. An apparatus as recited in claim 1, wherein the means for determining comprises a display and a selection device operative to choose portions of an image from the display.

9. An apparatus as recited in claim 1, wherein the means for determining comprises a software algorithm executed by a processor for automatically determining a fixed object image portion.

10. An apparatus as recited in claim 9, wherein the means for determining determines a fixed object image portion by comparing successive image data of a test field of view to determine a reference image portion having a fixed object therein and compares the reference image portion with portions of the first and second image data.

11. A method for detecting motion in an area of interest, the method comprising:

(a) capturing, with an imaging device, first image data in a field of view of the imaging device, the first image data corresponding to a first portion of an area of interest;

(b) changing, with a panning mechanism, the field of view of the imaging device;

capturing, with the imaging device, second image data in the field of view of the imaging device, the second image data corresponding to a second portion of the area of interest, the second portion including a sub area that overlaps a sub area of the first portion to define an overlapping area;

(c) determining a fixed object image portion in the overlapping area;

(d) adjusting at least one of the first image data and the second image data based on the fixed object image portion and generating two sets of adjusted image data, each of the two sets of adjusted image data including overlapping area data corresponding to the overlapping area; and (e) after the step of adjusting at least one of the first image data and the second image data, determining if motion has occurred in the overlapping area by comparing the overlapping area data of the two sets of adjusted image data.

12. The method as recited in claim 11, wherein the steps (a) through (e) are repeated until substantially the entire area of interest has been monitored.

13. The method as recited in claim 11, further comprising:

capturing, with the imaging device, test image data in the field of view of the imaging device, the test image data corresponding to the area of interest including the fixed object;

determining fixed object data of the test image data corresponding to the fixed object; and storing the fixed object data as learned image data, wherein the step (c) comprises determining the fixed object portion according to the learned image data.

14. The method as recited in claim 13, wherein the step of determining fixed object data comprises displaying the test image data on a display and receiving, via a selection device, a selection of the fixed object data.

15. The method as recited in claim 13, wherein the step of capturing the test image data is repeated, and the step of determining fixed object data comprises comparing the successively captured test image data.

16. The method as recited in claim 13, wherein the step of determining fixed object data comprises executing a software algorithm for automatically determining the fixed object data.

* * * * *

UNITED STATES PATENT AND TRADEMARK OFFICE

CERTIFICATE OF CORRECTION

PATENT NO. : 7,609,290 B2
APPLICATION NO. : 11/044006
DATED : October 27, 2009
INVENTOR(S) : John Arthur McEwan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Twelfth Day of October, 2010

David J. Kappos
*Director of the United States Patent and Trademark Office*